Feb. 15, 1944.   S. W. BORDEN   2,341,854
RESISTANCE COMPARATOR
Filed Feb. 12, 1942   3 Sheets-Sheet 1

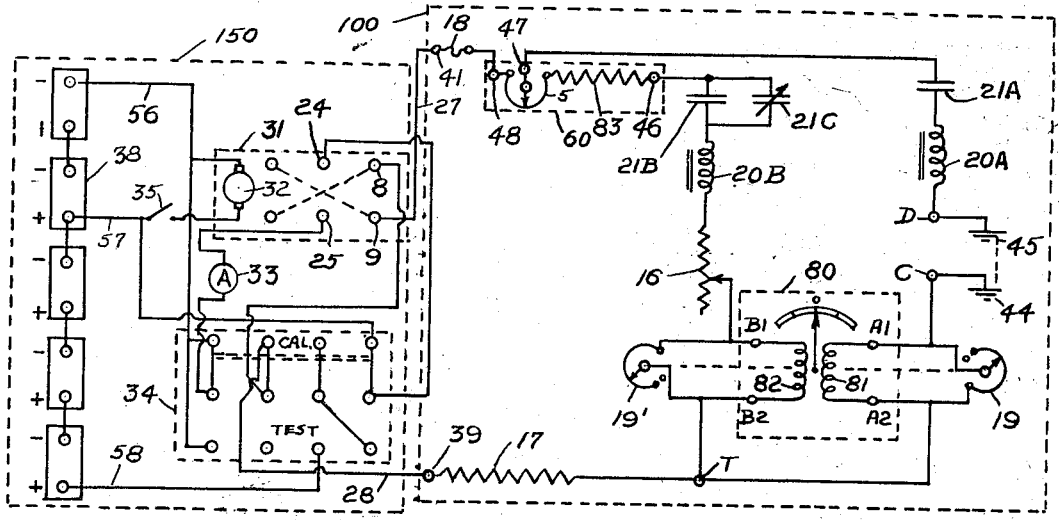
FIG. 2 CONNECTIONS WHEN SWITCH "90" IS IN "CALIBRATE" POSITION.
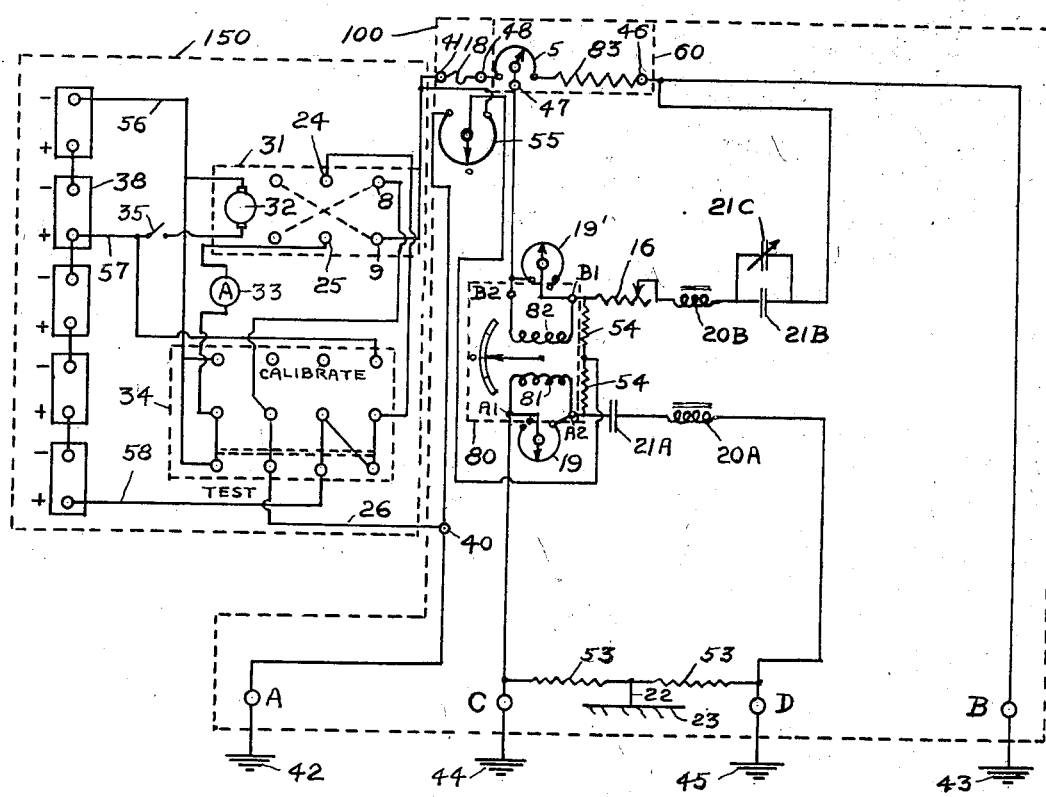
FIG. 3
CONNECTIONS WHEN SWITCH "90" IS IN "TEST" POSITION.

Feb. 15, 1944.                S. W. BORDEN                2,341,854
                           RESISTANCE COMPARATOR
                            Filed Feb. 12, 1942          3 Sheets-Sheet 3

Inventor
Stephen W. Borden
By
                                                         Attorney Patented Feb. 15, 1944

2,341,854

UNITED STATES PATENT OFFICE 2,341,854

RESISTANCE COMPARATOR

Stephen W. Borden, Summit, N. J.

Application February 12, 1942, Serial No. 430,625

4 Claims. (Cl. 175—182)

This invention relates to equipment for ascertaining varying geophysical conditions of subterranean portions of the earth crust by measuring differences in the electrical conductivity of the same.

The conditions above referred to may relate to the presence of ore bodies which differ in their ability to conduct electricity from the rocks which surround the same, or to the presence of fractured or broken zones and the thickness and extent of loose or alluvial material, or to the presence of water- and oil-bodies.

The invention is therefore particularly adapted for determining the location of mineral deposits, as an aid in mining, for ascertaining the position of water- or oil-bearing structures for use in determining structure or stratum and for the location of wells and openings to prospect the same, or for observing the geological conditions of the earth crust as a preliminary to engineering work, such as the construction of dams, the driving of tunnels, etc.

One of the objects of the invention is to provide equipment which, while having the necessary sensitivity, will be free from interference by foreign potentials created by stray earth currents or otherwise. Another object is to provide facilities for compensating for the electrode circuit resistance for certain kinds of tests. Other objects will appear from the specification and claims.

The equipment herein described is suitable for carrying out a test of the character described by F. G. Wenner in "A Method of Measuring Earth Resistivity," United States Bureau of Standards, Scientific Paper 258, 1915. The distinguishing feature of this method is that the potential between a pair of earth electrodes, due to a flow of current between another pair of earth electrodes, is measured for various locations and the geophysical conditions deduced therefrom.

Figure 1:
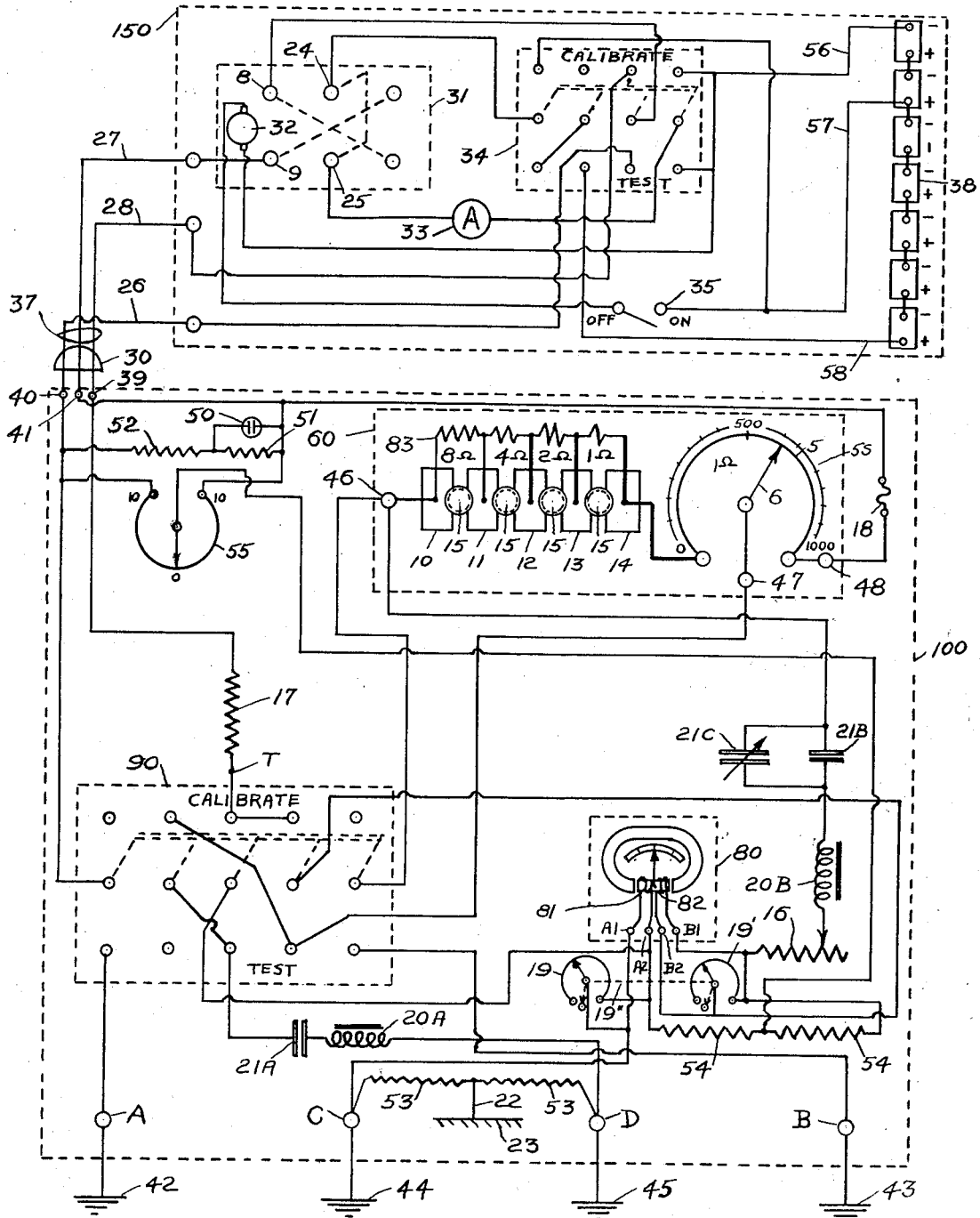
Figure 4:
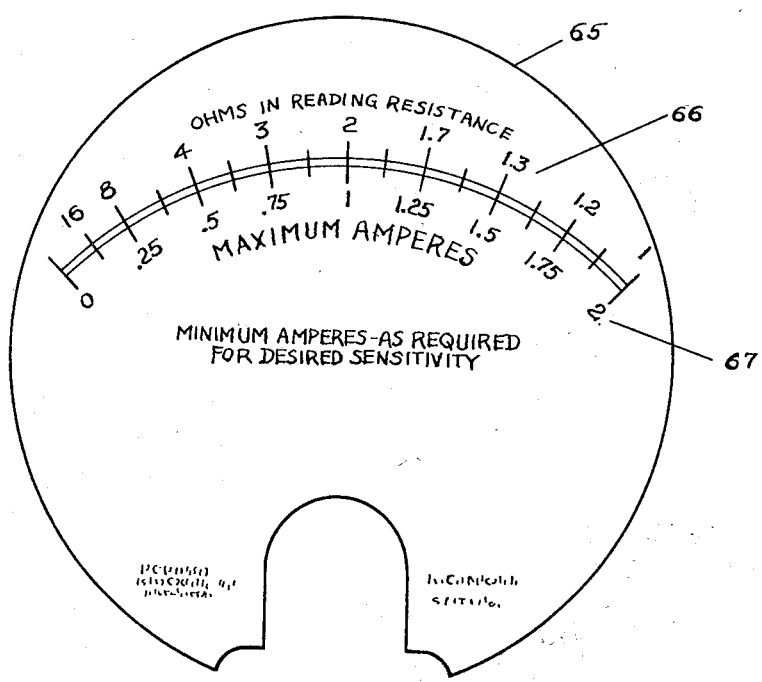

In the drawings, which are schematic, Fig. 1 illustrates the complete equipment arranged for a test. Fig. 2 is a simplified diagram showing the connections when the main switch 90 of Fig. 1 is thrown to the "calibrate" position, and Fig. 3 is a similar diagram when the switch is thrown to the "test" position. Fig. 4 is a detail of the dial of meter 33.

For carrying out these tests, I prefer swing current and a swing current meter. A complete exposition of the nature and use of swing current and swing current meters for testing purposes generally will be found in my U. S. Patent Re. 21,784, issued April 29, 1941, and types of generators for producing swing current are described in the above patent and in my U. S. Patent No. 2,300,770, issued Nov. 3, 1942. However, there are some test conditions where the use of swing current is not essential.

For use in the specification and claims of this application, the term "swing current" refers to a current flow produced by a potential which varies in a definite manner over a fixed period of time, repetitively, with substantially constant and uniform speed and with a frequency between 1 and 1.5 cycles per second. The wave form of the potential need not conform to any precise pattern. A "swing current generator" is to be understood to be a device for producing current either directly by generation or indirectly by modification of an existing potential.

In the specification and claims, the term "swing current meter" refers to a meter which has a unidirectional field (usually, but not necessarily, of the permanent magnet type) and a movable coil suspended in the field and arranged to deflect a needle over a center zero scale, the direction of deflection reversing with each change of direction of the current in the coil, the coil construction being such as to avoid all damping effects leaving the moving element free to swing as a substantially true pendulum when the coil circuit is open.

The basic features of this invention are already covered by my U. S. Patent No. 2,176,758, issued October 17, 1939, and this application covers the following additional features and improvements:

(1) The calibration of the differential meter is made by connecting the two element circuits in multiple and to any suitable source of potential which makes it possible to eliminate entirely the calibrating resistance previously employed. In addition the reading resistance is included in the element circuit during calibration.

(2) Means have been provided for compensation for leakage between the windings of the two elements on the moving coil of the differential meter and between various parts of the equipment and the metal base upon which they are mounted.

(3) An improved dial has been provided for the ammeter.

(4) Means have been provided for adjusting the phase relation of the currents in the elements of the differential meter.

(5) The sensitivity control rheostats have been provided with an open position at the point of full sensitivity.

(6) The connections to the 1 ohm slide-wire have been rearranged so that a potential tap only is taken off the slide-wire whereas previously the slide-wire was connected as a rheostat and the resistance of the sliding contact was part of the slide-wire resistance, which is objectionable where the resistance values concerned are low.

(7) Interconnections between the "high and low voltage" switch and the "calibrate and test" switch which preclude the possibility of high voltage being applied to the meter elements when in the calibration position.

Referring now to the drawings, Fig. 1. All of the equipment within the dotted enclosure 100 composes the resistance comparator proper and is customarily assembled in a single housing.

The equipment within the dotted enclosure 150 includes a source of direct current 38, a four-pole double-throw switch 34, a swing current generator 31, an ammeter 33, and a switch 35. The equipment as a whole within the enclosure 150 may be termed a swing current power supply and usually the power supply is connected by a 3 conductor cable 37 to a plug 30 which may be inserted in a receptacle mounted in the comparator and having three receptacles 39, 40 and 41 for the reception of the three-pronged plug 30. The plug and receptacle are polarized to insure proper connections.

The swing current generator, within the dotted enclosure 31, is shown schematically only and it is intended to represent any suitable type of swing current generator. At the present time the best type I know of is the type described in my U. S. Patent 2,300,770 issued Nov. 3, 1942. The generator consists essentially of a double-pole double-throw switching device operated by a motor 32, which may be turned on and off by switch 35, the operation of the device being such as to produce swing current and complete details of such operation are fully set forth in my U. S. Patent Re. 21,784 and also in my U. S. Patent 2,300,770.

The battery 38 may conveniently be a number of radio B batteries. A tap as 57 is taken off to provide motor 32 with a suitable operating voltage which may conveniently be from 90 to 130 volts. By means of switch 34 there may be applied to the center terminals 24 and 25 of generator 31 either the voltage existing between leads 56 and 57 or that between leads 56 and 58, the former being generally referred to as the "Calibrating" or "low" voltage and the latter as the "Test" or "high" voltage, although the calibrating voltage may also be used for testing purposes when no higher voltage is necessary.

In the comparator unit 100 the equipment within the dotted enclosure 60 is termed a "Reading resistance" and consists of a number of fixed resistance units as 83 connected in series and in series with a slide-wire 5 the resistance circuit starting at the terminal 46 and terminating at the terminal 48. The slide-wire has a resistance of 1 ohm and is provided with a conventional sliding contact and pointer 6 which moves over a scale 5S divided into 1,000 equal parts starting at 0 and ending at 1000. The fixed resistance unit connected to the zero end of the slide-wire is a 1 ohm unit, the next a 2 ohm unit, the next a 4 ohm unit, the next an 8 ohm unit, and so on upward, each unit being double that of the next lower unit, until a desired maximum range is obtained. Each end of each of the fixed units is connected to a heavy contacting terminal as 10, 11, 12, 13 and 14, and means are provided, such as 15, for short circuiting any one of the units. 15 may be a conventional plug fitting suitable recesses in the terminal blocks as is done in conventional plug bridge practice. The sliding contact 6 is connected to a terminal 47. The drop across the reading resistance is taken between terminals 46 and 47 and it will be clear that the unit may be set for any value between zero and maximum, in this case 16 ohms, in steps of .001 ohm.

Within the dotted enclosure 80 is a differential meter. 81 is a winding on a movable element having its terminals connected to A1 and A2 and 82 is a winding on the same movable element and having its terminals connected to B1 and B2. A sensitivity control 19 is connected across terminals A1 and A2 and the sensitivity control 19' is connected across terminals B1 and B2. The two elements 19 and 19' are mounted on a common shaft 19'' and revolve together and when turned to the limit clockwise the meter elements are short circuited and when turned to the limit counter-clockwise the rheostat elements are open circuited. 20A and 20B are choke coils, 21A and 21B are condensers, and 21C an adjustable condenser. 16 is an adjustable resistor. 54—54 is a center tapped resistance unit used in conjunction with potentiometer 55 as a means for compensating for leaking between the meter elements 81 and 82. 53—53 is a resistance element connected between terminals C and D and center tapped through conductor 22 to the metal face plate of the meter represented by 23. Within the dotted enclosure 90 is a switch having two positions marked "Calibrate" and "Test." 17 is a fixed resistor. 51 and 52 are fixed resistors which are connected across the source of supply with a tap taken off to a neon lamp 50 which serves as an indicator of over-voltage. A, B, C and D are terminal posts for connection to four earth electrodes as 42, 43, 44 and 45 respectively.

The circuit from C into the earth via electrode 44, through the earth and out of the earth via electrode 45 to terminal D, is hereinafter referred to as the "potential electrode circuit." The resistance of this circuit may be anything from a few ohms to several thousand ohms and, of course, must not be confused with the resistance of that portion of the earth path between current electrodes 42 and 43 across which the drop in potential is picked up by electrodes 44 and 45 and the resistance of which is frequently less than one ohm due to its large cross sectional area which is that of a cylinder having a radius equal to twice the distance between the potential electrodes.

In conducting a test by the Wenner method and using the apparatus shown in Fig. 1, terminals A, B, C and D are connected to earth electrodes as 42, 43, 44 and 45 respectively. The electrodes 42 and 43 are termed current electrodes, while 44 and 45 are termed potential electrodes. The plug 30 is inserted in terminals 39, 40 and 41.

The first operation is to throw switches 35 and 34 to the "calibrate" position which results in the equipment being connected as shown in Fig. 2. From Fig. 2 it will be seen that terminal 8 of generator 31 is connected through calibrating resistance 17 to a junction T and output terminal 9 of the generator is connected through fuse 18 and a portion of the slide wire to terminal 47. It will be seen that the two elements 81 and 82 of the differential meter, each in series with other circuit elements, are connected in multiple between points T and terminal 47. In series with element 81 is the potential electrode circuit 44—45, the choke coil 20A and the condenser 21A while in series with element 82 is the variable resistor 16, the choke 20B, and the fixed condenser 21B with the variable condenser 21C in shunt and substantially all of the reading resistance. It will be seen that with switch 34 in the calibrating position the relatively low voltage between leads 56 and 57 is supplied to terminals 24 and 25 of the swing current generator and the calibrating resistance 17 is of suitable value for calibrating the meter on the potential value thus provided. The potential between leads 56 and 58 might be as high as 400 or 500 volts and if this voltage were applied to points T and terminal 47 through the resistor 17, the meter would probably be ruined and in any case it is necessary that the calibration be carried out at a fairly definite voltage and since motor 32, which is also fed from taps 56 and 57 necessarily must have a fairly constant and definite voltage, we are assured of a fairly definite and constant calibrating voltage between terminals T and 47 so long as switch 34 is in the calibrating position. If, inadvertently, switch 34 be put in the "test" position when switch 90 is in the "calibrate" position, the circuit through lead 28 will be opened thus eliminating any possibility of the "test" voltage being applied between terminals T and 47. By reference to Fig. 1 it will be seen that when switch 90 is in the "test" position, terminal T is disconnected from both the elements A2 and B2 and thus it is that the two switches 90 and 34 cooperate in such manner that it is impossible for the high test voltage to be applied to the meter elements when they are in the calibrating position. Since switch 34 may be opened under load an extra pole has been provided so that it may open the circuit at three points simultaneously.

With the switches in the calibrating position, switch 34 closes the circuit from the battery to the swing current generator and, the motor being started by closing switch 35, calibrating swing current is applied between points T and 47. The resistance of the potential electrode circuit 44—45 may be anything from a few ohms to several thousand ohms, depending upon the character of the soil in which the test is being conducted, and in order to compensate for this resistance the adjustable resistor 16 is provided. The first step in the calibration is to estimate the value of the resistance to be measured and to set the reading resistance to that value. The resistor 16 is then adjusted until the two elements are as nearly balanced as may be, but it may be found that a perfect balance can not be obtained by adjusting resistor 16 due to the fact that the current in the two windings 81 and 82 are not exactly in phase, this phase displacement being due to the fact that the potential electrode circuit is not purely non-inductive or because the choke coils and/or condensers may have changed physically. This out-of-phase condition may be eliminated by adjusting the adjustable condenser 21C. It is of course understood that the choke coils 20A and 20B are normally of equal impedance. When adjustable condenser 21C is set at half capacity, the combined capacity of 21B and 21C is normally equal to the capacity of 21A. I prefer to use approximately 90 henrys of choke coils and approximately 20 microfarads of capacity in series with each other meter element. 21C has a total capacity of about one microfarad.

The sensitivity of the set generally is so high that the balance may be upset by changes in the capacity of condensers 21A and 21B over a period of time or due to temperature effects even though they are of the best possible quality and it will be noted that in calibrating the swing current meter any change which may have taken place in these condensers or in the chokes is taken care of and accounted for and the set is calibrated under the actual working conditions existing at the time it is to be used.

Because of the high sensitivities involved, it is necessary to provide sensitivity controls 19 and 19' and these consist of rheostats on a common shaft and operated by a common knob and pointer which registers on a scale. However, it is essential that these rheostats both open circuit at the point of maximum sensitivity because it is commercially impractical to build a dual rheostat of this sort in which the resistance values in each element will be at all times exactly alike regardless of the position of the sliders and they must therefore be open circuited when the final balance is made.

Having calibrated the set as described, switch 90 is now thrown to the "test" position which results in establishing connections as shown in Fig. 3, providing switch 34 is also thrown to the "test" position. If switch 34 is thrown to the calibrating position, the only result is to supply to the generator the lower voltage existing between conductors 56 and 57 instead of the high test voltage existing between conductors 56 and 58. The current flow should be adjusted to an approximate value as later explained.

In the "test" position, Fig. 3, current flows from the swing current generator terminal 8 into earth electrode 42, thence through the ground and out through electrode 43 and back through the reading resistance 60 and fuse 18 to terminal 9 of the generator. Element 82 of the meter is connected to receive the drop across the reading resistance 60, through the condensers 21B and 21C, choke 20B and variable resistor 16. The other meter element 81 is connected across the potential electrodes 44 and 45 with choke 20A and condenser 21A in series. It now remains only to adjust reading resistance 60 until the meter pointer stops swinging thus indicating a balance between elements 81 and 82. If a perfect balance is not obtained condenser 21C is adjusted to the value which gives the minimum swing and if this is not zero the remaining swing is eliminated by adjusting the leakage device 55. These adjustments are never sufficient to make any difference in the balancing position of reading resistance 60. The value of reading resistance 60, which is necessary to balance the meter, gives the value of the resistance of the earth path between electrodes 44 and 45, which is the information for which the test has been conducted. It will be noted that the contact resistance of the sliding contact on slide wire 5 does not enter into the value of the reading resistance. The value of reading resistance 60 thus obtained will ordinarily be sufficiently accurate but if the maximum accuracy of the set is desired the following precautions should be taken.

In order that the current flowing through the reading resistance while testing may be kept within the safe current carrying capacity of its resistance units, ammeter 33 is provided with an ampere scale 67 on which the pointer indicates the current flowing and with scale 66 on which may be read the maximum allowable total resistance of the reading resistance for any particular current flow—thus—if the reading resistance contains a total of 2 ohms or more the current must be limited to 1 ampere to prevent damaging the reading resistance by overheating.

If the final position of reading resistance 60 is found to differ more than 10% from the approximate value assumed during the calibrating period it is well to recalibrate the meter using the more accurate approximation obtained by the first test. This recalibration is ordinarily required only in the case of the first in a series of tests since the change in resistance from one test position to the next is usually not sufficient to require a second calibration and in any case the second calibration will consist only in a readjustment of the adjustable resistor 16.

In the differential meter there is but a single moving element consisting of two moving coils, one inside the other, and under test conditions there may be a considerable difference of potential between these two coils and when designed to withstand a difference of potential of say 500 volts, which voltage is frequently needed for geophysical work, there is bound to be a certain amount of leakage between the coils and even if perfectly insulated, so to speak, there still would be some current flow due to the capacity effect. This leakage current, unless compensated for, will produce an error in the final reading. In order to provide this correction, I connect a resistor 54—54 of approximately 60 megohms resistance between terminals A2 and B1 and from a center tap on this resistance I connect to the center of a 9 megohm potentiometer unit 55 which potentiometer unit is connected directly across the testing potential. In order to properly adjust the leakage compensator, the equipment is put in operation with switches 34 and 90 in the "test" positions but with post B disconnected from electrode 43 since in this position the only current flowing in coils 81 and 82 is leakage current. The potential applied should be that to be used in the ensuing test. Potentiometer 55 is then adjusted until the deflection disappears. If this is done little or no further adjustment of the leakage control will be found necessary.

All of the equipment involved is usually mounted on a metal panel and leakage between the various parts and the metal panel may produce errors and in order to overcome these, I connect a resistor, as 53—53, of approximately 2 megohms between terminals C and D and connect the center point of this resistor to the metal plate 23 and I have found that with this arrangement it is immaterial whether the metal plate is grounded or not whereas without this compensator different readings may be had depending upon whether or not the operator, who is ordinarily standing on the ground, may happen to be touching any part of the plate or metal housing of the meter or upon whether or not the metal housing is resting upon the ground or upon a wooden box or other insulating support.

In the preferred form of my invention I utilize swing current but for some tests reasonably satisfactory results may be obtained by using direct current and in some other cases alternating current of commercial frequencies or extra high frequencies may be employed. In such cases it is of course necessary that the differential meter be suitable for the type of current used and when direct current is used the condensers in series with the meter elements must be omitted and when alternating current is used it is advisable to omit the choke coils.

What I claim is:

1. Equipment for measuring the resistance of a portion of a circuit through which an electric power current is flowing and where the conditions are such that a connection to the points of the circuit between which the resistance is to be measured is possible only through a connection circuit having appreciable resistance of unknown value, which includes; a reading resistance connected in the power circuit, a differential null detector having one element connected, via an adjustable resistance, across the reading resistance and responsive to the drop in potential produced by current flowing through the reading resistance and the other element connected, via the connection circuit, to the points of the power circuit between which the resistance is to be measured; and switch mechanism having an operating position as "test" and an operating position as "calibrate" and interconnecting leads so interconnecting the equipment that when the switch is in the "test" position the equipment is connected in the foregoing manner and when the switch is in the "calibrate" position the power circuit through the portion of the circuit whose resistance is to be measured is open circuited, the first element is connected via its adjustable resistance to receive a calibrating potential whose value is independent of the value of the power current or the setting of the reading resistance or of the value of any current flowing in the reading resistance and the second element is connected, via the connecting circuit and that portion of the power circuit whose resistance is to be measured, to receive a calibrating potential identical with the calibrating potential received by the first element.

2. Equipment for making geophysical surveys comprising a source of current connected in series with a reading resistance and a first pair of ground electrodes adapted to be inserted at spaced points in a geological formation, a second pair of electrodes for connection to the ground across a portion of the formation between the points at which said first named electrodes are connected to the formation, a differential meter having a first and second element, conductors connecting the reading resistance to one of said meter elements and conductors connecting the second pair of electrodes to the second meter element; together with a high resistance unit connected between a terminal of the first meter element and a terminal of the second meter element said resistance unit having a center tap connected to the sliding contact of a high resistance potentiometer the ends of which are connected to the source of current.

3. A potential comparator for comparing the potential difference existing between two earth potential electrodes with the potential drop across a reading resistance; which includes a reading resistance, a first and second binding post for connection to the potential electrodes, a null detector having a first element connected to the reading resistance and responsive to the drop in potential across the reading resistance and a second element; a third and fourth binding post for connection to two energizing current electrodes; two terminals for connection to a source of test current; interconnecting conductors for connecting the reading resistance and the energizing electrodes in series and to the terminals for connection to the source of test current and for connecting the first meter element to the reading resistance and for connecting the second meter element to the first and second binding posts and sheet metal means for supporting the foregoing mentioned equipment together with a high resistance unit connected between the first and second binding posts and having a center tap connected to the sheet metal means.

4. A potential comparator for comparing the potential drop across a resistance of unknown value with the potential drop across a variable resistance of known value which includes; a differential meter having a first element for connection across the variable resistance and a second element for connection across the unknown resistance each element having associated equipment permanently in series therewith; a source of test current for supplying a current flow through the adjustable resistance and the unknown resistance in series and a source of calibrating potential for calibrating the differential meter; a two position power switch having a test position and a calibrate position and so connected to the source of test current and to the source of calibrating potential that when in the test position the source of test current is connected to its output terminals and when in the calibrate position the source of calibrate potential is connected to its output terminals; a two position meter switch having a test position and a calibrate position and so connected to the two meter elements that the elements may be connected for testing with one element across each of the resistances, or for calibrating with the two elements and their associated series equipment in multiple; together with conductors interconnecting the two switches in such manner that when the power switch is in the test position and the meter switch is in the calibrate position no potential is applied between the terminals of either meter element.

STEPHEN W. BORDEN.